US008931378B2

(12) United States Patent
Paulson et al.

(10) Patent No.: US 8,931,378 B2
(45) Date of Patent: Jan. 13, 2015

(54) METHOD AND APPARATUS FOR DRY LUBRICATION OF A THIN SLITTING BLADE

(75) Inventors: Richard F. Paulson, Phillips, WI (US); James A. Cummings, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 306 days.

(21) Appl. No.: 12/854,492

(22) Filed: Aug. 11, 2010

(65) Prior Publication Data

US 2011/0036220 A1 Feb. 17, 2011

Related U.S. Application Data

(60) Provisional application No. 61/232,961, filed on Aug. 11, 2009.

(51) Int. Cl.
*B26D 7/08* (2006.01)
*B23D 19/04* (2006.01)
*B26D 1/24* (2006.01)
*B26D 7/12* (2006.01)
*B26D 7/26* (2006.01)

(52) U.S. Cl.
CPC ................ *B26D 7/088* (2013.01); *B26D 1/245* (2013.01); *B26D 7/12* (2013.01); *B26D 2007/2657* (2013.01)
USPC .................................... 83/13; 83/149; 83/495

(58) Field of Classification Search
CPC .......... B26D 7/088; B26D 7/20; B26D 1/225; B26D 1/245; B26D 7/2635; B26D 7/08; B23D 59/102; B23D 59/04; B23D 55/082; B23D 59/02
USPC ................. 83/169, 495–507, 522.15–522.17, 83/522.22, 522.23; 493/365, 367, 369
See application file for complete search history.

(56) References Cited

U.S. PATENT DOCUMENTS 2,134,018 A * 10/1938 Alderman .................. 242/485.3
2,741,281 A * 4/1956 Braun ............................. 83/168
2,796,933 A * 6/1957 De Gelleke ...................... 83/506
2,895,553 A * 7/1959 De Gelleke ...................... 83/469
3,452,734 A * 7/1969 Cleland et al. .................. 125/21
3,563,285 A * 2/1971 Thrasher ......................... 83/818
3,593,763 A * 7/1971 Neild .............................. 83/169
3,674,065 A * 7/1972 Fairfield et al. .................... 83/13
4,028,973 A * 6/1977 Bogdanski et al. ............. 83/169
4,635,513 A * 1/1987 McGeehee ...................... 83/169
4,848,200 A * 7/1989 McGehee ....................... 83/169
4,873,759 A * 10/1989 Burch ............................. 29/700
4,896,793 A * 1/1990 Briggs et al. ..................... 221/73
4,983,145 A * 1/1991 Hirai et al. .................... 474/117
5,054,582 A * 10/1991 Aracil ............................ 184/3.2
5,090,281 A * 2/1992 Paulson et al. ..................... 83/13
5,159,866 A * 11/1992 Dunham ......................... 83/169
5,165,314 A 11/1992 Paulson et al.
5,197,366 A * 3/1993 Paulson et al. .................. 83/498
5,393,174 A * 2/1995 Wawrzyniak ................... 407/51
5,406,869 A * 4/1995 Prochnow et al. ................ 83/22

(Continued)

*Primary Examiner* — Ghassem Alie
*Assistant Examiner* — Bharat C Patel
(74) *Attorney, Agent, or Firm* — Andrus Intellectual Property Law, LLP

(57) ABSTRACT

A block of a solid lubricant material, such as PTFE, is biased continuously or intermittently against the cutting edge of a rotary slitting blade for corrugated paperboard. The solid lubricant block prevents the build up of starch adhesive and biasing movement compensates for wear of the block and wear of the cutting blade edge.

11 Claims, 6 Drawing Sheets

(56) References Cited

U.S. PATENT DOCUMENTS

| | | | | | |
|---|---|---|---|---|---|
| 5,435,217 | A | * | 7/1995 | Kato et al. | 83/100 |
| RE35,086 | E | * | 11/1995 | Paulson et al. | 83/13 |
| 5,494,368 | A | * | 2/1996 | Matthews | 403/259 |
| 5,616,406 | A | * | 4/1997 | Nakamaru et al. | 442/19 |
| 5,667,347 | A | * | 9/1997 | Matthews | 411/150 |
| 5,925,299 | A | * | 7/1999 | Dierckes et al. | 264/154 |
| 5,971,342 | A | * | 10/1999 | Sakai et al. | 248/430 |
| 6,128,990 | A | * | 10/2000 | Drew et al. | 83/168 |
| 6,165,117 | A | * | 12/2000 | Adami | 493/365 |
| 6,431,037 | B1 | * | 8/2002 | Dai et al. | 83/13 |
| 6,826,993 | B2 | * | 12/2004 | Michalski | 83/508 |
| 6,837,135 | B2 | * | 1/2005 | Michalski | 83/477.2 |
| 7,299,727 | B2 | * | 11/2007 | Gravely et al. | 83/22 |
| 7,325,473 | B2 | * | 2/2008 | Belfiglio | 83/824 |
| 2005/0183559 | A1 | * | 8/2005 | Rue | 83/574 |
| 2006/0075864 | A1 | | 4/2006 | Adami | |
| 2008/0105096 | A1 | * | 5/2008 | Gravely et al. | 83/169 |
| 2008/0236354 | A1 | * | 10/2008 | Esposito | 83/169 |
| 2011/0036220 | A1 | | 2/2011 | Paulson et al. | |

* cited by examiner

FIG. 8
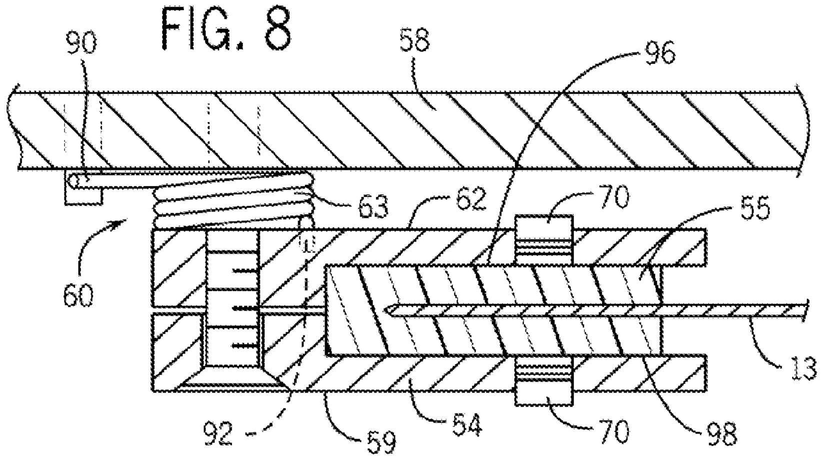
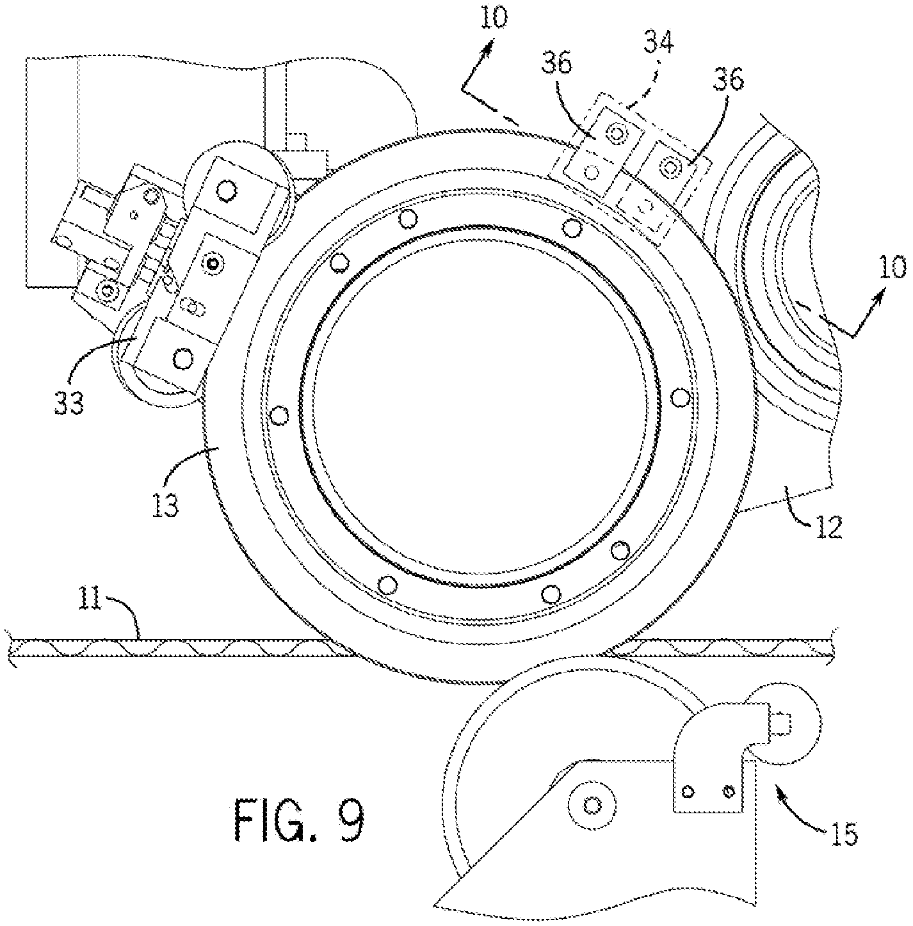
FIG. 9

METHOD AND APPARATUS FOR DRY LUBRICATION OF A THIN SLITTING BLADE

CROSS REFERENCE TO RELATED APPLICATION

This application relates to and claims priority from U.S. Provisional Application Ser. No. 61/232,961 filed on Aug. 11, 2009.

BACKGROUND OF THE INVENTION

The present invention relates to an apparatus for slitting a moveable web of corrugated paperboard and, more particularly, to a lubricator system that uses Teflon or other suitable lubricant pucks or blocks that are physically pinched or loaded onto a slitting blade to assist in sharpening of said blade and to prevent build-up of starch or similar adhesive associated with the production of the corrugated paperboard.

A slitter/scorer is used on the dry end of a corrugator to slit and score the corrugated web emerging from the double backer so as to create multiple independent "outs" that can be routed to the upper or lower level of a cutoff knife. The knife then cuts these "outs" to designated lengths to create the independent sheets that are then stacked. The slitting tool used to slit the web is a thin blade of approximately 1-2 mm in thickness that rotates at high speed with the corrugated web supported below the blade by a rotating solid anvil as described in U.S. Pat. No. 5,090,281, the disclosure of which is incorporated by reference herein.

The web that is slit is formed in and emerges from an upstream double backer with a green bond of the starch adhesive on the lower liner that has a propensity to adhere to the thin slitting blade. A standard approach to prevent starch from building up on the thin blade involves wiping a lubricating fluid onto the blade using a wick lubricator pad. A pressurized oil feed is used to wet the wick. The wick is replaced at frequent intervals to insure a fresh surface free of starch accumulation.

There are several problems with this conventional approach to thin blade lubrication. First, there is potential for over lubrication and wetting of the wicks that can result in dripping of lubricant onto the top of the board, particularly at corrugator stop. Also, to the extent that the wick wipes the lubricant on the blade, this same lubricant can contaminate the edges of the corrugated board.

To address this issue and to make this problem acceptable to corrugated manufacturers who are manufacturing board for food-grade applications, a food-grade acceptable lubricant is necessary. This is expensive and not universally acceptable. Also, the food-grade lubricant works less well than, for example, a WD-40 type lubricant. Another problem is associated with the pumps and valves and lubricant lines that have to be routed to the slit blades resulting in a complicated and maintenance-intensive system. Lubricant must be stirred to prevent coagulation. Valves become stuck. Lubrication pads need to be changed on at least a daily basis and this is expensive and labor intensive.

A recently introduced solution to the lubrication problem involves use of a polytetrafluoroethylene (PTFE) block as an anvil. This concept is described in U.S. Patent Application Publication US2006/0075864 A1 with publication date Apr. 13, 2006. The thin slitting blade plunges into the anvil and the PTFE block then lubricates the blade as it rotates in the PTFE support. As the blade wears away the PTFE, the blocks can be laterally shifted to create a new PTFE wear block.

This solution to lubrication creates a problem on long runs between order changes where the PTFE wears. Without an order change, it is not possible to shift the block to solve the wear issue. Also, the constant lateral feeding of PTFE blocks into the machine is labor intensive and is not routinely done by plant operating personnel. As the thin blade is plunged into the PTFE block, it works effectively, but as it wears, the effectiveness of the lubrication rapidly decreases.

SUMMARY OF THE INVENTION

The present invention is directed to a method and apparatus for lubricating the thin blade with a dry lubricant that is self compensating with wear of the lubricating means.

One object of this invention is to provide a slitting device that is particularly suited to slitting of corrugated paperboard without deformation of the edges of the board as a consequence of build-up of starch adhesive on the slitting blade.

Another object of the invention is to allow continuous operation of the slitting process without requirement to interrupt the process flow so as to maintain effective operation of the slitter.

Another object of the invention is to maintain even, effective slitting performance throughout the useful wear life of the thin blade lubricating means.

Yet another object is to eliminate the problem of dripping of wet lubricant on the corrugated board by use of a dry lubricating means. It is also an object of this invention to simplify the process of blade lubrication by elimination of lubricating lines, pumps, filters, stirring systems, and valves associated with prior art wet lubricating systems.

These and other objects and advantages are achieved by use of continuously loaded wear pucks of PTFE, or other lubricating material, onto each side of the thin blade used for slitting of the corrugated paperboard web. In this embodiment, the pucks are loaded against the blade edge with continuous adjustment using springs, air cylinders, or other load biasing means well known to those skilled in the art. There is a puck for each side of the thin blade. Each puck may have its own loading system. The pucks are retained or captured within a fixed lubricator housing that is carried on the tool head that carries the slitting blade. The loading system is mounted to the outside of the housing and in one embodiment, attaches via a loading plunger or rod through a suitable opening in the lubricator housing. The lubricator pucks may float within the housing so that they can achieve the correct contact surface with the sharpened cutting edge of the thin slitting blade. In one embodiment of the invention, there are lubrication housings on each side of the blade offset from one another. This allows the lubricator pucks to travel laterally beyond the tip of the blade on the outer edge as the blade wears.

In another embodiment of the invention, a single puck is radially loaded against the rotating thin blade with the natural spring force of the puck material loading the bifurcated sides of the puck against the opposing edges of the thin blade.

One particularly appealing feature of the puck lubrication apparatus is that lubricant can be applied at a position around the periphery of the blade other than the point of contact of the thin blade with the corrugated board. This makes it possible to use effective board support means such as the slotted anvil of U.S. Pat. No. 6,837,135.

Since the lubricator pucks are continuously loaded against the thin blade, the puck maintains contact with the blade as it wears in the lubrication transfer process. The pucks may also be free floating to the point that they adapt to the blade as the blade wears during the blade sharpening process. It is particularly advantageous that the loading of the lubrication puck against the blade occurs continuously during rotation of the blade with no interruption of the slitting process required to adjust the puck.

In another embodiment of the invention, the loading means can be retracted by physical means or automatically to avoid continuous lubrication of the blade while it turns but is not in use as a selected tool in the slitting process, or when intermittent lubrication is acceptable.

Yet another problem associated with the PTFE block is the requirement to adjust the relative position of the blade being lubricated by the block. As the blade wears and the radius decreases, the blade must be frequently discretely adjusted to maintain an effective position of the blade in the block.

In yet another embodiment of the invention, a pair of PTFE rods are positioned in an "X" type configuration and continuously biased in a radial direction against the blade to be lubricated. The rods pivot about their base and are biased to create a force on each rod that acts normal to the end of the rod forcing the rod into contact with the blade edge. This results in a variable loading of the rods onto the blade as a function of how deeply the blade is biased into the throat of the crossed rods.

There may be several formats of lubrication pucks other than PTFE that could provide the necessary starch release protection on the slitting blades and any suitable solid puck lubricant used would be within the scope of the invention.

BRIEF DESCRIPTION OF THE DRAWINGS

FIG. 8 is a sectional view similar to FIG. 7 showing an addition to the FIG. 7 embodiment;

FIG. 9 is a side elevation of a web slitting apparatus showing an alternate embodiment of the invention that is repositioned with respect to the slitting blade;

DETAILED DESCRIPTION OF THE INVENTION

Figure 1:
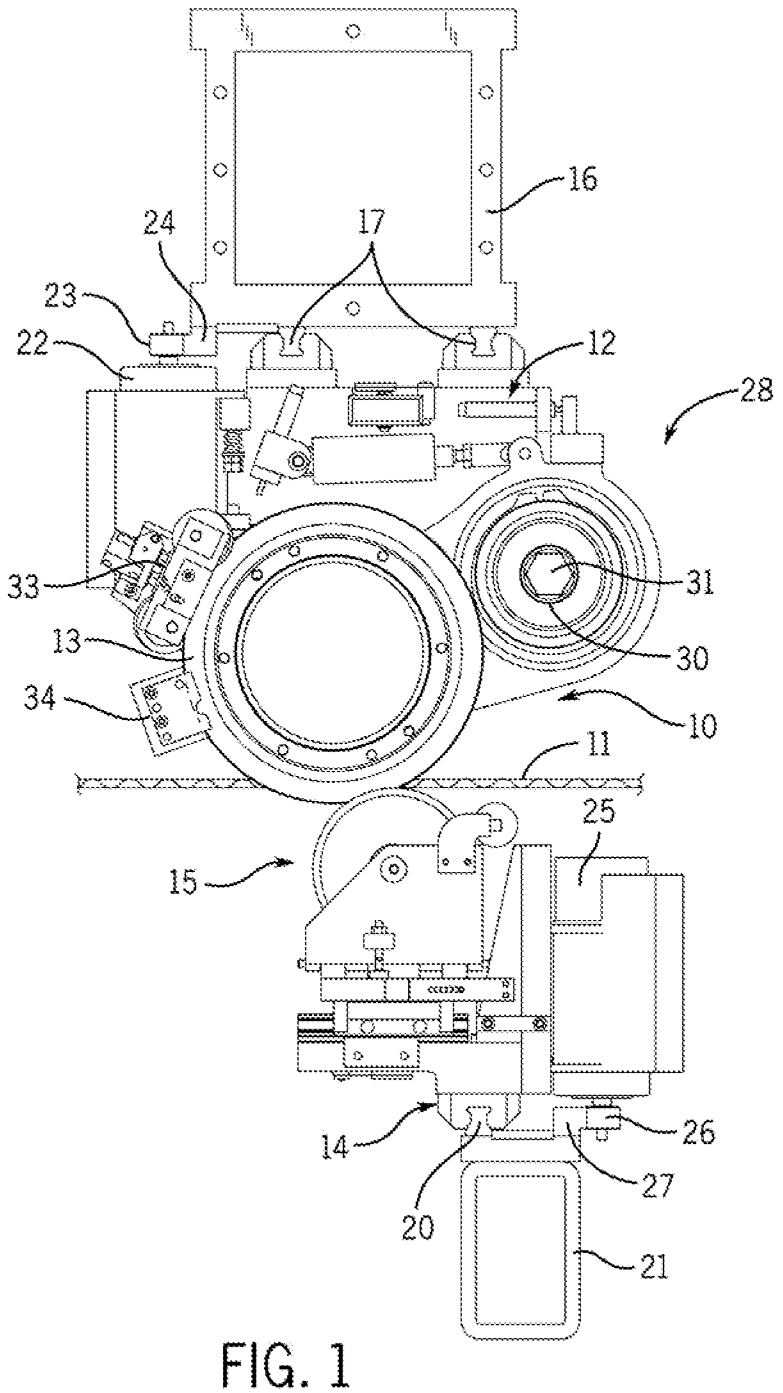
FIG. 1 is a side elevation view of a conventional web slitting apparatus on which is mounted a blade lubricator of the subject invention in its presently preferred embodiment.
Figure 3:
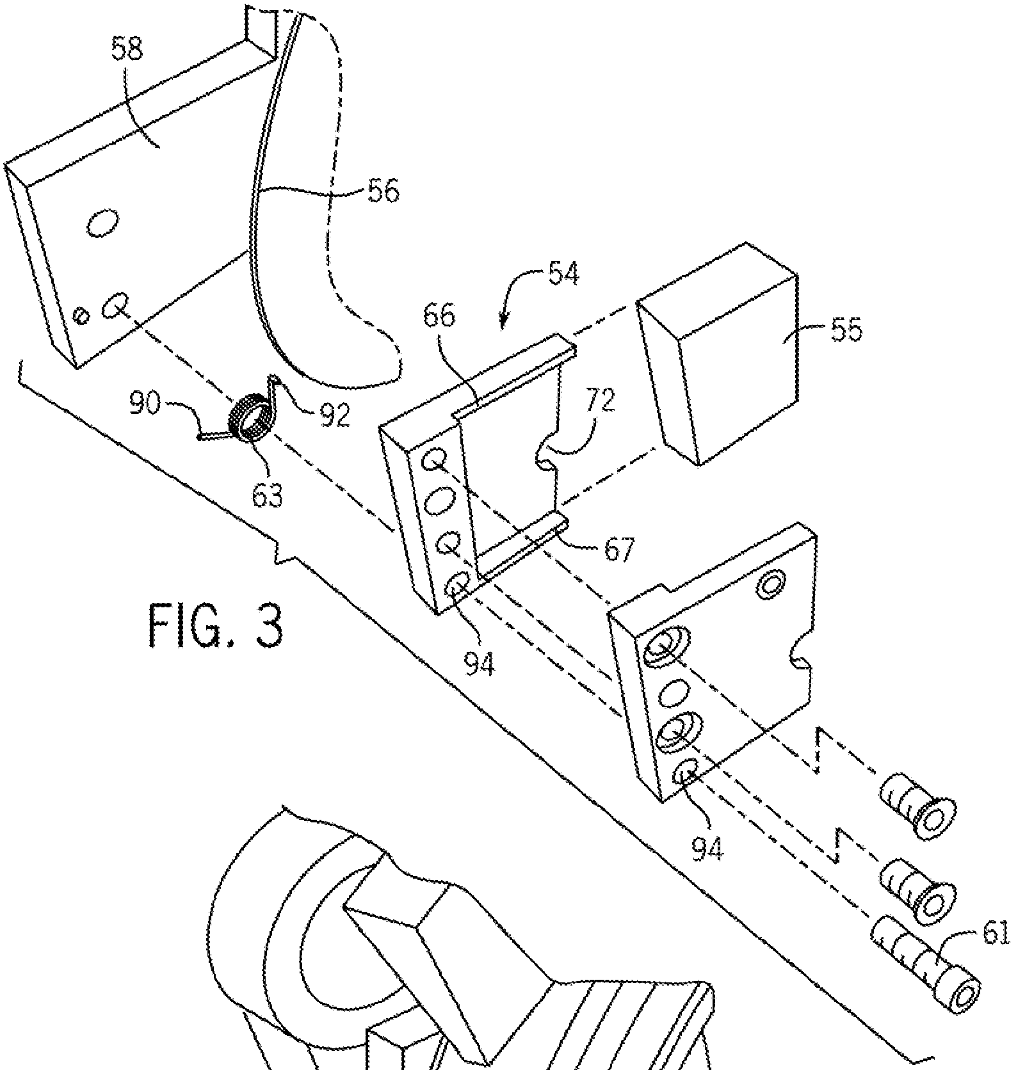
FIG. 3 is an exploded view of the components of the invention shown in FIG. 2.

Referring initially to FIG. 1, a web slitting apparatus 10, suited particularly for slitting a moving corrugated paperboard web 11, includes an upper tool head 12 carrying a rotary slitting blade 13. A lower counterhead 14 is mounted below the web and carries a web-supporting anvil roll assembly 15. The upper tool head 12 is supported for lateral movement in the cross machine direction on a pair of linear bearing ways

17 that are attached to the underside of an upper box beam 16. Similarly, the lower counterhead 14 is supported for lateral movement in the cross machine direction on a lower linear way 20 mounted on the upper face of a lower box beam 21. Upper tool head 12 is moved along the upper linear ways 17 to position the slitting blade 13 by an upper servomotor 22 driving a pinion 23 that engages a linear rack 24 attached to the upper box beam 16 and extending parallel to the linear ways 17.

In a similar manner, lateral positioning of the anvil roll assembly 15 on the lower counterhead 14 utilizes a lower servomotor 25 driving a pinion 26 that engages a lower linear rack 27 attached to the lower box beam 21 and extending parallel to the lower linear way 20.

In a typical slitting apparatus 10, multiple pairs of upper and lower tool heads 12 and 14, respectively, are positioned along their respective box beams 16 and 21. Each of the upper tool heads 12 carries a rotatable drive assembly 28 including a center drive hub 30 with a hexagonal throughbore that receives a hexagonal shaft 31. The drive assembly 28 is operable to drive the slitting blades 13 and to permit their positioning in the cross machine direction on the hexagonal shaft 31 utilizing suitable microprocessor control. The upper tool head 12 typically carries a blade sharpener 33 for each slitting tool head for on-the-fly sharpening.

Figure 10:
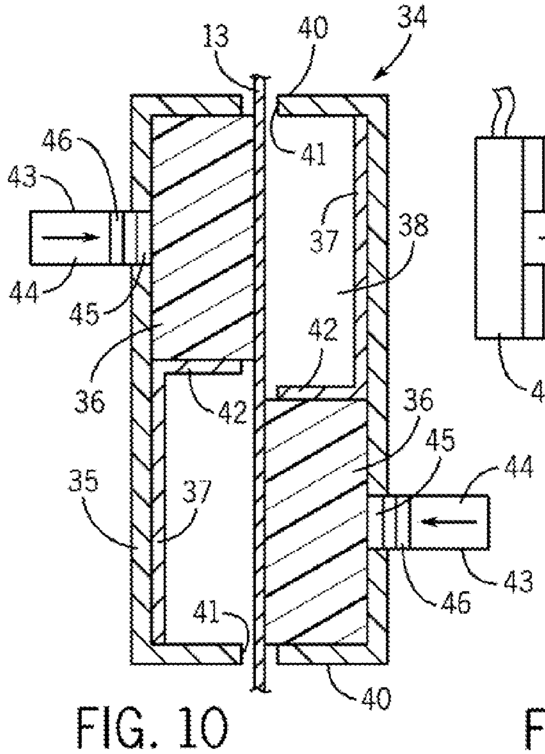
FIG. 10 is a sectional detail taken on line 10-10 of FIG. 9.

In accordance with the present invention, the tool head 12 also carries a contact blade lubricator 34 that improves upon and replaces the wet lubricator pads of the prior art as discussed above. One embodiment is shown in FIGS. 9 and 10. The blade lubricator 34 includes a housing 35 mounted in a stationary position on the upper tool head 12. Within the housing, there are mounted a pair of solid lubricant pucks 36, preferably made of polytetrafluoroethylene (PTFE). The pucks 36 are mounted within the housing 35 on opposite sides of the slitting blade 13. Each puck is seated within the housing 35 in a puck holder 37 secured within the housing, but allowing limited movement of the pucks to engage both faces of the blade edge.

Referring particularly to FIG. 10, the lubricator housing 35 preferably comprises a box-like structure having an open interior substantially closed on five sides, but having an open operating face 38. The end walls 40 of the housing 35 are provided with slots 41 which, together with the operating face 38, accommodate entry of the slitting blade 13. Each of the puck holders 37 is secured in the housing 35 by gluing or other attachment means. The puck holders 37 have an L-shaped cross section including a short leg 42 that, together with the open interior of the housing 35, nest the pucks 36 for limited movement toward the blade 13 with a puck positioned on and in bearing contact with each side of the blade edge. The pucks are mounted such that they are spaced circumferentially with respect to the circular blade edge.

Each puck 36 is biased laterally (perpendicular to the slitting blade 13) by a spring plunger 43 or other biasing device. The spring plunger 43 maintains the puck in intimate contact with the cutting blade edge and edge faces as the puck wears and as the blade diameter is reduced as a result of on-the-fly sharpening by the blade sharpener 33. Each spring plunger 43, which is of conventional construction, is mounted in a casing 44 attached to a side face of the housing 35. Within the casing 44 there is located a plunger head that bears directly on the puck 36 under the biasing influence of a spring 46. Multiple spring plungers may be used with each puck.

Figure 2:
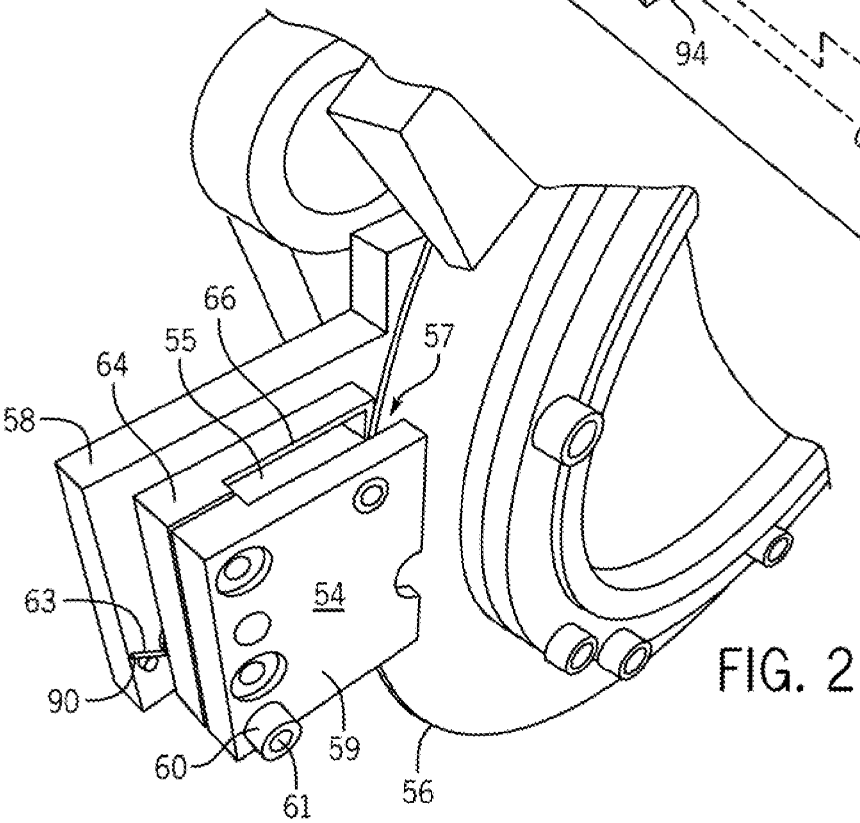
FIG. 2 is an enlarged perspective detail of the web slitting apparatus of FIG. 1 showing the preferred embodiment of the prevent invention in greater detail.
Figure 4:
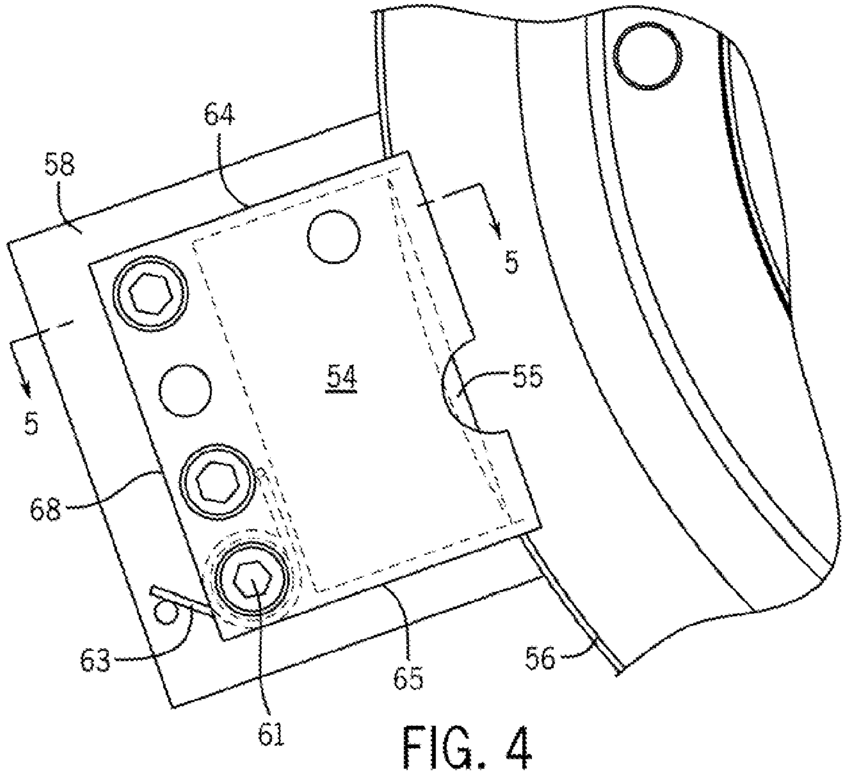
FIG. 4 is a side elevation detail of the blade lubricator shown in FIGS. 1-3 in its initial operative position.
Figure 5:
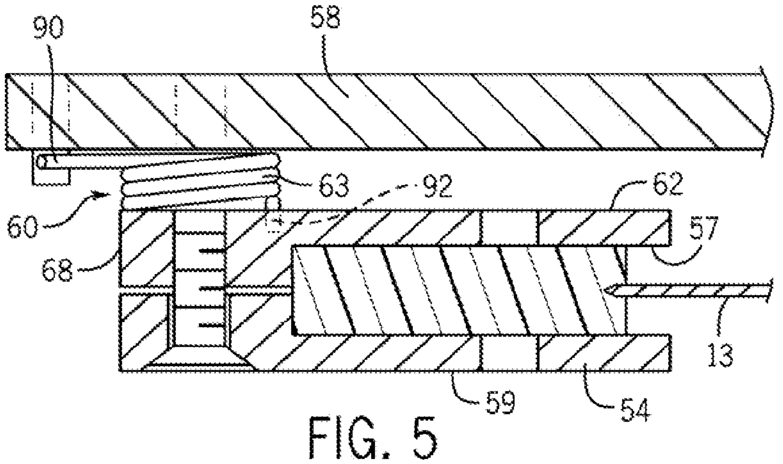
FIG. 5 is a sectional view taken on line 5-5 of FIG. 4.
Figure 11:
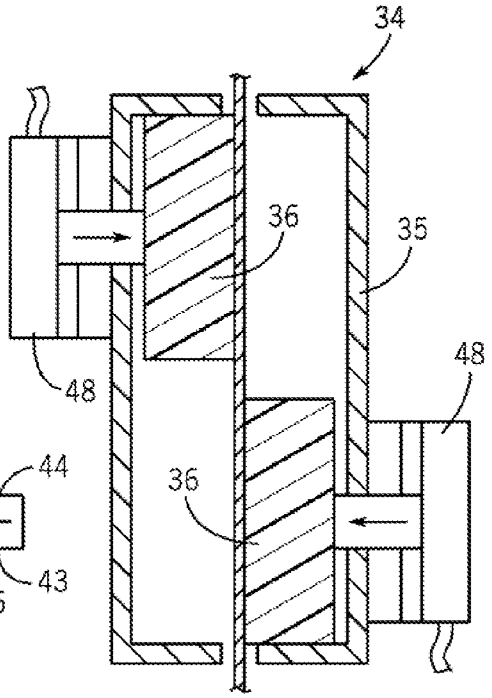
FIG. 11 is a sectional detail similar to FIG. 10 showing another embodiment thereof.
Figure 13A:
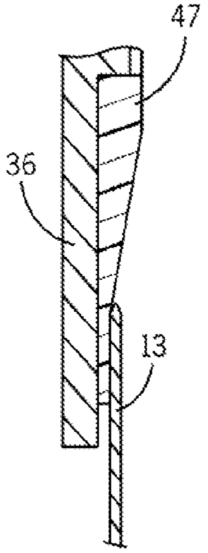

As the pucks are worn away by contact with the slitting blade and the slitting blade itself is worn by operation of the blade sharpener 33, the pucks assume a cross sectional shape shown in FIG. 13A in which the radially outer portion 47 of the puck remains essentially unworn and retains its full thickness, but thins in the radially inward direction. Thus, the pucks 36 must be separated or spaced circumferentially with respect to the blade so that the unworn radially outward portions 47 of the pucks do not interfere with one another as the pucks are worn away. FIG. 11 is a view similar to FIG. 10 in which the biasing arrangement utilizes an air cylinder 48 to bias each puck into contact with the slitting blade edge. Otherwise, this embodiment is the same as that shown in FIG. 2.

Figure 12:
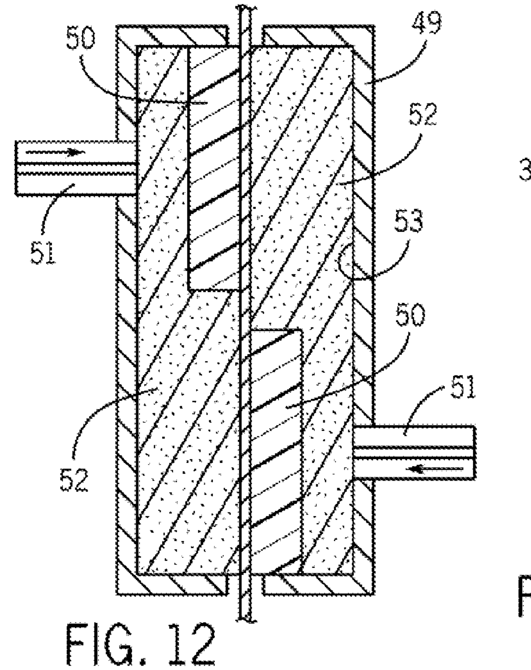
FIG. 12 is a sectional detail of yet another embodiment of the invention; and, FIGS. 13A and 13B are sectional details showing wear patterns developed in alternate embodiments of the invention.

In FIG. 12, there is shown a further embodiment of the blade lubricator of the present invention. In this arrangement, a pair of circumferentially spaced solid lubricant pucks 50 are biased into contact with the outer blade edge by a pair of spring plungers 51 which may be the same as or similar to the spring plunger 43 described above. The plungers may include a retractable feature as is well known with these devices. The pucks 50 are nested in a liquid lubricant-retaining wick 52. Each of the wicks 52 has a stepped construction such that a puck 50 is seated in the thinner portion of the wick which, together with an identical but reversed puck and wick for the other side of the blade, are inserted and held in the housing 49 through an open end face 53. Each side of the housing 49 carries a spring plunger 51 which is operatively biased through the side wall of the housing against the thinner stepped portion of the wick 52. The bias force, in turn, presses the pucks 50 against the side faces of the slitting blade edge. This construction provides an advantage in applications where the starch adhesive used in the manufacture of the web 11 utilizes a particularly aggressive formulation that might tend to build up unacceptably if only solid lubricant pucks are used.

The presently preferred embodiment of the invention is shown in FIGS. 2-8. In this embodiment, a lubricator housing 54 holds a rectangular block of solid lubricant 55 and the block and housing together are biased radially into contact with the circular edge of the slitting blade 56. The lubricator housing 54 is a rectangular box-like enclosure, substantially closed on all sides, except for an open end face 57 through which the rectangular lubricant block 55 is inserted. Conveniently, the housing may comprise two mirror halves bolted together as shown. The housing 54 is supported on the blade head 58 with a pivotal attachment 60 permitting pivotal movement of the housing 54 and lubricant block 55 between a non-contact inoperative position (shown in phantom in FIG. 6) and an operative position with the block 55 biased into contact with the blade edge (shown in FIG. 4). The pivotal attachment 60 includes a pivot shaft that extends between and interconnects an inner side wall 62 of the housing 54 and the blade head 58. In one example, the pivot shaft 61 extends from the blade head 58 and through an aperture 94 in a corner of the housing 54 that is distal the blade 56. The pivot shaft 61 carries a biasing mechanism, which in one example comprises a torsion spring 63, the ends of which operatively interconnect the housing inner side wall 62 with the blade head 58. For example, a first end 90 of the torsion spring 63 is seated on the blade head 58 and a second end 92 of the torsion spring 63 is seated on the housing 54. (See FIGS. 2, 3, 5, and 7.) The force of the torsion spring 63 biases the housing 54 and lubricant block 55 against the edge of the slitting blade 56.

Figure 6:
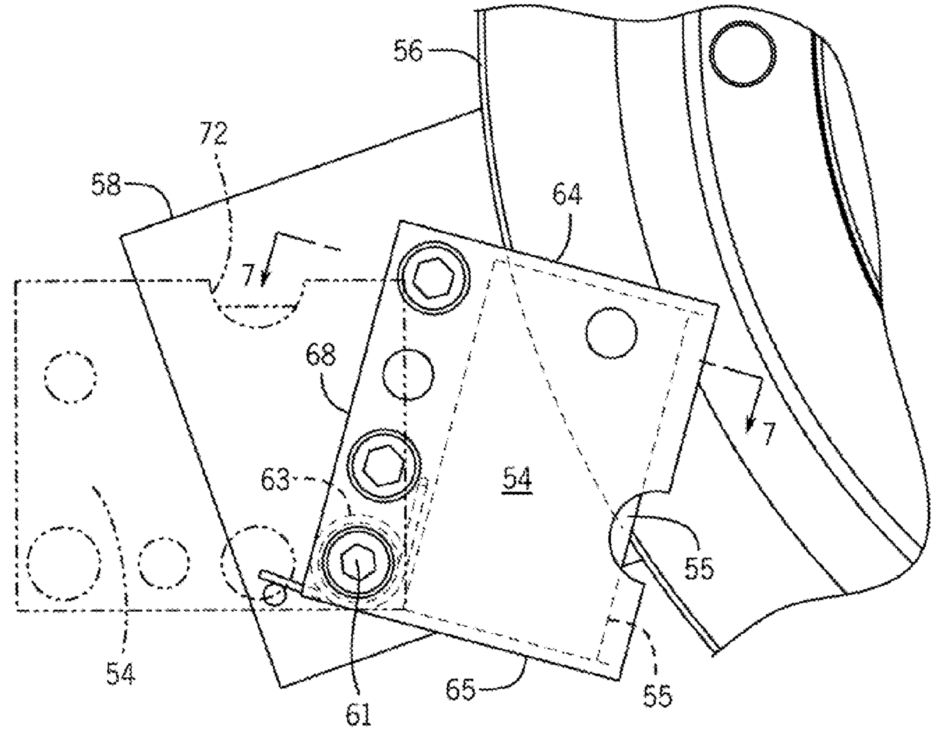
FIG. 6 is a side elevation detail similar to FIG. 4 showing a position of the blade lubricator as the contact lubricator is cut away in use.
Figure 7:
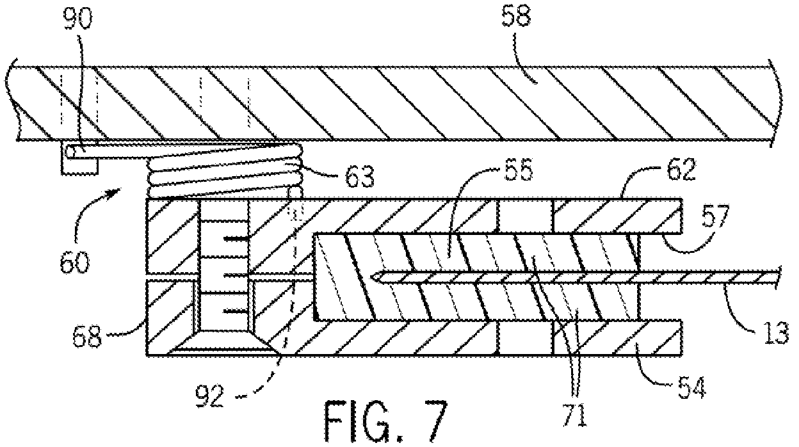
FIG. 7 is a sectional view taken on line 7-7 of FIG. 6.

The upper end wall 64 and lower end wall 65 of the housing 54 are provided, respectively, with end wall slots 66 and 67 that extend from the open end face 57 toward the rear housing end face 68. Both slots 66 and 67 provide clearance for the slitting blade 13 as it penetrates the lubricant block biased into engagement therewith. The lower end wall slot 67 is just wide enough to provide the necessary blade clearance. The upper end wall slot 66 is somewhat wider and provides a clear view of slitting blade penetration into the lubricant block such that the useful life of the block can be visually monitored. In the embodiment shown, total blade penetration into the lubricant block may be about 1 inch (25 mm), but the size of the housing 54 and lubricant block 55 may be varied widely to provide a much greater blade penetration. The rate of blade penetration into the block 55 and the effective wear life of the block may be varied considerably depending on the bias force and the hardness of the PTFE block. For example, in one embodiment of the invention, the blade may penetrate the block at a rate of 0.0001 inch (0.0025 mm) per minute. At this rate, and assuming a maximum penetration of 1 inch (25 mm), the block would last up to 165 hours before replacement would be necessary. As may be seen in FIGS. 6 and 7, the slitting blade 13 penetrates the block 55 in a generally diagonal path as best seen in FIG. 6. From this position, the housing and slit block may be pivoted to the inoperative position and the block reversed in the housing 54.

Figure 13B:
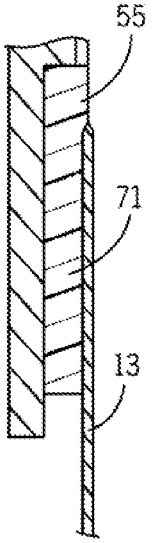

In certain applications, it is possible that, as the slitting blade penetrates the lubricant block, the separated halves 71 of the slit block, only one of which is shown in FIG. 13B, may become more flexible and not provide adequate bearing contact with the opposite blade faces near the blade edge. In this case, it may be desirable to provide a supplemental lateral blade force to bias the lubricant block halves toward one another. As shown in FIG. 8, this can be most easily accomplished by using a biasing mechanism, such as, for example, a retractable spring plunger 70 that may be the same as the spring plunger 43 described above. The spring plunger 70 is counled to, and in one example, mounted in the outer side wall 59 near the open end face 57 and the upper end wall slot 66 such that, when the spring is released, the head of the spring plunger 70 will bear against the side of the lubricant block and squeeze the two slit block halves 71 more tightly together. Although an oppositely disposed spring plunger 70 could also be used, a single plunger 70 is believed to be adequate. In the example shown, in FIG. 8, the spring plunger 70 is a biasing mechanism that is coupled to the inner side wall 62 of the housing 54 and that bears against a first side 96 of the lubricant block 55. Another spring plunger 70 may be provided in the outer side wall 59 and bear against a second, opposite side 98 of the lubricant block 55.

FIG. 6 shows the lubricant housing and lubricant block assembly pivoted to its inoperative position away from the slitting blade. The edges of the housing inner side wall 62 and outer side wall 59, defining the open end face 57 of the housing 54 are provided with semicircular recesses 72 to facilitate grasping the lubricant block 55 for insertion into or removal from the housing 54.

What is claimed is:

1. In an apparatus for slitting a running corrugated paperboard web including an annular rotary slitting blade mounted on a blade head on one side of the web for slitting engagement of the web supported on the other side by an anvil, a dry lubrication system for the blade cutting edge comprising:

a unitary block of a solid plastic lubricant supported on the blade head and biased radially inwardly into slitting contact with opposite blade faces defining the blade edge, wherein the solid plastic lubricant block is maintained in substantially uniform contact with the blade edge faces to compensate for wear of the block during slitting and wear of the blade edge from sharpening;

a rectangular box housing that holds the block and that is pivotally attached to the blade head via a pivot shaft extending from the blade head to the housing, the housing being biased with respect to the blade head and pivotable about the pivot shaft with respect to the slitting blade independently of any pivotal movement of the blade head itself; and a biasing mechanism having a first end seated on the blade head and a second end seated on the housing, and providing a force to continually advance the housing and the block held therein radially inwardly toward the slitting blade to guide the blade edge in a planar path into and across the block and to maintain contact of the blade edge with the block as the block is penetrated by the slitting blade.

2. The apparatus as set forth in claim 1 wherein the block is made of polytetrafluoroethylene.

3. The apparatus as set forth in claim 1 wherein the unitary lubricant block comprises a partially slit body straddling the blade edge faces in contact therewith and with the blade edge.

4. In an apparatus for slitting a running corrugated paperboard web including an annular rotary slitting blade mounted on a blade head on one side of the web for slitting engagement of the web supported on the other side by an anvil, a dry lubrication system for the blade cutting edge comprising:

a blade lubricator housing supported on the blade head adjacent an outer edge of the slitting blade by a pivot shaft that extends from the blade head and through an aperture in a corner of the housing that is distal the slitting blade;

a unitary block of a solid plastic lubricant positioned in the housing to present a working face for slitting contact by the blade edge;

the housing being mounted for rotation about the pivot shaft between a non-operative position in which the block does not contact the slitting blade and an operative position in which the block does contact the slitting blade and is biased radially into lubricating contact with the blade edge thereby defining a slit in the block;

a first biasing mechanism having a first end seated on the blade head and a second end seated on the housing, and providing a force to continually advance the housing and the block positioned therein radially inwardly toward the blade edge so as to maintain the lubricating contact as the block is worn away by the slitting blade; and a second biasing mechanism coupled to a side wall of the housing and bearing against the block, and operable to move the block in a lateral direction toward a face of the slitting blade so as to maintain the lubricating contact as the block is worn away by the slitting blade.

5. The apparatus as set forth in claim 4 wherein the housing comprises a rectangular box substantially completely enclosing the block and having an open face adapted to removably receive and hold the block.

6. The apparatus as set forth in claim 4 wherein rotation of the housing about the pivot shaft into the operative position causes the blade edge to penetrate the block on a generally diagonal path across the block and the housing.

7. The apparatus as set forth in claim 4 wherein the first biasing mechanism comprises a torsion spring mounted on the pivot shaft to interconnect the housing and the blade head and bias the housing into the operative position as the torsion spring attempts to achieve a rest position.

8. The apparatus as set forth in claim 5 wherein the housing includes parallel opposite end wall slots extending from the open face to provide clearance for the slitting blade as the slitting blade penetrates the block and cuts into the block.

9. The apparatus as set forth in claim 4 wherein the housing is supported on the blade head and is pivotable with respect to the slitting blade independently of any pivotal movement of the blade head itself.

10. In an apparatus for slitting a running corrugated paperboard web including an annular rotary slitting blade having first and second blade edge faces opposite one another, the slitting blade mounted on a blade head on one side of the web for slitting engagement of the web supported on the other side by an anvil, a dry lubrication system for the blade cutting edge comprising:

a lubricator holder comprising a rectangular box having a first side wall and a second, opposite side wall, the holder box being supported on the blade head adjacent an outer edge of the blade;

a one-piece solid block of a lubricant material supported in the holder box for movement therewith in a generally radial direction with respect to the blade and into slitting contact by the blade edge;

a pivot shaft extending from the blade head to the holder box;

a first biasing mechanism situated between the blade head and the holder box, and operable to rotate the holder box and the block of lubricant material about the pivot shaft in the radial direction and with the blade edge on a path to maintain said slitting contact as the block of lubricant material is worn away by the blade; and a second biasing mechanism coupled to the first side wall of the holder box and bearing against a first side of the block of lubricant material, and a third biasing mechanism coupled to the second side wall of the holder box and bearing against a second, opposite side of the block of lubricant material;

wherein the second and third biasing mechanisms are operable to apply opposite lateral forces to the first and second sides of the block of lubricant material so as to maintain said slitting contact between the block of lubricant material and both the first and second blade edge faces as the block of lubricant material is worn away by the blade.

11. The apparatus as set forth in claim 10 wherein the first biasing mechanism is operable to provide continuous biasing of the block of lubricant material into said slitting contact and wherein rotation about the pivot shaft allows the blade edge to continually advance relative to the holder box with pivotal movement of the holder box generally diagonally across the block of lubricant material and the holder box as the block of lubricant material is worn away by the slitting blade; the block of lubricant material being reversible in the holder box to present a new block face for slitting penetration by the blade edge.

* * * * *

UNITED STATES PATENT AND TRADEMARK OFFICE

CERTIFICATE OF CORRECTION

PATENT NO. : 8,931,378 B2
APPLICATION NO. : 12/854492
DATED : January 13, 2015
INVENTOR(S) : Paulson et al.

It is certified that error appears in the above-identified patent and that said Letters Patent is hereby corrected as shown below:

In the claim

Column 7, line 52, Claim 6 Delete "4" and insert --5--.

Signed and Sealed this
Twenty-eighth Day of April, 2015

Michelle K. Lee
*Director of the United States Patent and Trademark Office*